(12) United States Patent
Bucher et al.

(10) Patent No.: US 7,988,202 B2
(45) Date of Patent: Aug. 2, 2011

(54) BRANCH CONNECTION STUB, A BRANCH CONNECTION DEVICE COMPRISING A MAIN PIPE AND SAID BRANCH CONNECTION STUB, AND A METHOD OF CONNECTING SUCH A BRANCH CONNECTION STUB BY WELDING

(75) Inventors: Bruno Bucher, Pont de l'Arche (FR); Claude Pomies, Magnanville (FR); André Chauvin, Saint Martin la Garenne (FR); Philippe Beauverger, Saint Just (FR)

(73) Assignee: SNECMA, Paris (FR)

( * ) Notice: Subject to any disclaimer, the term of this patent is extended or adjusted under 35 U.S.C. 154(b) by 62 days.

(21) Appl. No.: 12/389,804

(22) Filed: Feb. 20, 2009

(65) Prior Publication Data
US 2009/0224025 A1 Sep. 10, 2009

(30) Foreign Application Priority Data
Mar. 4, 2008 (FR) ...................... 08 51388

(51) Int. Cl.
*F16L 5/00* (2006.01)
(52) U.S. Cl. ...................... 285/201; 285/189; 285/288.1
(58) Field of Classification Search .................. 285/201, 285/189, 141.1, 288.1, 229, 235
See application file for complete search history.

(56) References Cited

U.S. PATENT DOCUMENTS

| | | | | |
|---|---|---|---|---|
| 1,292,812 A | * | 1/1919 | Lachman | 285/189 |
| 1,392,204 A | * | 9/1921 | Nichols | 220/62.18 |
| 1,427,616 A | * | 8/1922 | Moore | 285/201 |
| 1,779,902 A | * | 10/1930 | Davies | 285/288.1 |
| 1,837,490 A | * | 12/1931 | Stresau | 285/288.1 |
| 1,872,357 A | * | 8/1932 | Straty | 285/189 |
| 1,896,216 A | * | 2/1933 | Brandt | 285/288.1 |
| 1,933,772 A | * | 11/1933 | Stresau | 285/201 |
| 2,047,633 A | * | 7/1936 | Jacobus | 285/288.1 |
| 2,179,476 A | * | 11/1939 | Andrus | 285/189 |
| 2,209,325 A | * | 7/1940 | Dennis | 285/288.1 |
| 2,471,475 A | * | 5/1949 | Andrus | 285/288.1 |
| 2,788,232 A | * | 4/1957 | Stadthaus | 285/201 |
| 3,026,130 A | * | 3/1962 | Morrell | 285/201 |
| 3,717,200 A | * | 2/1973 | Pavilon | 285/288.1 |
| 4,089,535 A | * | 5/1978 | Sattinger | 285/288.1 |
| 4,305,429 A | * | 12/1981 | Parras | 285/189 |
| 4,544,030 A | * | 10/1985 | Crook et al. | 285/189 |
| 4,770,447 A | * | 9/1988 | Umehara | 285/189 |
| 5,564,753 A | | 10/1996 | Juttelstad | |
| 7,396,050 B2 | * | 7/2008 | Marioni | 285/235 |
| 2002/0195426 A1 | | 12/2002 | Vasudeva et al. | |

FOREIGN PATENT DOCUMENTS

| | | |
|---|---|---|
| DE | 8523497 U1 | 10/1985 |
| FR | 1 414 179 | 10/1965 |

* cited by examiner

*Primary Examiner* — David E Bochna
(74) *Attorney, Agent, or Firm* — Weingarten, Schurgin, Gagnebin & Lebovici LLP

(57) ABSTRACT

A branch connection stub for connection to a main pipe. The branch connection stub presents an outside surface of revolution and has at least one axial internal passage, a rear segment with a fastener flange, an intermediate segment, and a front segment having a free end presenting a circular outline suitable for being mounting by plane welding around a circular opening in the wall of the main pipe. The intermediate segment includes a first wall and a second wall forming between them an acute angle towards the internal passage. The branch connection stub is applicable to a hot heat exchanger for rocket engines.

11 Claims, 3 Drawing Sheets

BRANCH CONNECTION STUB, A BRANCH CONNECTION DEVICE COMPRISING A MAIN PIPE AND SAID BRANCH CONNECTION STUB, AND A METHOD OF CONNECTING SUCH A BRANCH CONNECTION STUB BY WELDING

FIELD OF THE INVENTION

The invention relates to a branch connection stub for making a branch connection to a main pipe, to a branch connection device comprising a main pipe and said branch connection stub, and to a method of connecting at least one branch connection stub to a main pipe by welding.

BACKGROUND OF THE INVENTION

The installation of a branch connection on a main pipe constitutes a point of weakness, particularly when the branch connection forms a heat exchanger with the fluid conveyed by the main pipe, there being large temperature differences between the fluid conveyed by the main pipe and the fluid of the branch connection.

In space applications for rocket engines where the engine is fed with propellant components at high pressure by means of turbopumps, such a heat exchanger, then referred to as a "hot" heat exchanger, may consist in heating liquid helium entering at a temperature of −263° C. to an outlet temperature close to 20° C. for operating requirements of the cryogenic engine.

Under such conditions, it will be understood that the branch connection, and in particular the stub mounted on the main pipe in order to make the branch connection, must be capable of withstanding extreme temperatures, and temperature differences that give rise to expansions or even structural modifications to the materials constituting the parts of the branch connection, which can lead to weakening of the mechanical connection between the parts.

As a general, rule, and as shown in FIG. 1, in order to make a branch connection on a main pipe 10, an annular flange 12 is used that is mounted by welding on the circular opening 14 of a collar 16 made in the wall of the main pipe 10. The opening 14 through which the branch connection is made to the main pipe 10 differs from the openings formed at each of the ends of the main pipe.

For this purpose, the collar 16 is made by panel beating techniques, i.e. by deforming the sheet metal constituting the wall of the main pipe 10. More precisely, rotary tools are used that successively perform an operation of piercing and cutting out an elliptical orifice, an operation of transversely stretching the material surrounding said orifice so as to constitute the collar 16, and then a turning operation with rotary cutters to obtain the final shape for the collar 16 and its circular opening 14.

Nevertheless, and in particular because of the stretching applied to the material to form the collar 16, the sheet metal becomes thinner in the collar. The collar 16 is also subjected to a concentration of stresses due to the pressure of the fluids and to external forces, thereby leading to thermal deformations that appear in the form of plastification and thus as a loss of elastic qualities that would enable the branch connection to remain intact during successive cycles.

It will be understood that modifying the qualities of this zone leads to weakness and to risks of breakage that are unacceptable.

OBJECT AND SUMMARY OF THE INVENTION

An object of the present invention is to provide a solution that makes it possible to overcome the drawbacks of the prior art and in particular to make a branch connection using a technique that enables the branch connection to withstand the thermal and mechanical operating stresses to which the connection and the main pipe are subjected.

To this end, according to the present invention, the branch connection stub for connection to a main pipe presents an outside surface of revolution and that it includes at least one axial internal passage, a rear segment with a fastener flange, an intermediate segment, and a front segment having a free end presenting a circular outline suitable for mounting by plane welding around a circular opening in the wall of the main pipe, said intermediate segment comprising a first wall and a second wall forming between them an acute angle towards the internal passage.

In this way, it will be understood that the fastener flange serves to connect a main pipe to a secondary pipe or to any other connection part. In characteristic manner, the intermediate segment presents the shape of a bellows fold and thus enables differential expansion to be absorbed, by providing axial and radial flexibility to the stub.

This solution also presents the additional advantage of enabling welding to be performed simply by virtue of the plane circular outline of its free end, thereby guaranteeing a weld bead that is uniform.

The bellows fold shape of the intermediate segment means that, between the first and second walls of the intermediate segment, there exists a right angle or preferably an acute angle towards the internal passage. This concave face can also be obtained by an intermediate segment made up of more than two walls, each consecutive pair of walls in the axial direction defining between them a right angle or preferably an acute angle towards the internal passage.

Amongst the geometrical configurations for the first and second walls of the intermediate segment that enable such a bellows fold to be formed, mention can be made of the following possibilities:

the first wall of the intermediate segment forms an annular wall extending outwards from the rear segment, and the second wall of the intermediate segment forms an annular wall between the first wall of the intermediate segment and the front segment;

the first wall of the intermediate segment forms an annular wall extending radially outwards from the rear segment or else the first wall of the intermediate segment forms an annular wall flaring axially from the rear segment, i.e. it forms an annular flare from the rear segment; or the second wall of the intermediate segment forms an annular taper from the first wall of the intermediate segment towards the front segment, i.e. it forms an annular wall tapering axially from the rear segment, or else the second wall of the intermediate segment forms an annular passage extending axially between the first wall of the intermediate segment and the front segment (the second wall of the intermediate segment then constituting a circular section cylinder).

In addition, and preferably, the walls of the intermediate segment and of the front segment present thickness that is substantially constant, and in particular smaller than the thickness of the walls of the rear segment, thereby enabling the entire portion of the stub constituted by the intermediate segment and the front segment, which segment is connected to the main pipe, to form a zone of axial and radial flexibility in the stub.

The present invention also provides a branch connection device between a main pipe and at least one secondary pipe, the device comprising:

a main pipe having a wall presenting a plane circular opening that is not coaxial with the main pipe, and at least one branch connection stub that presents an outside surface of revolution and that includes at least one axial internal passage, a rear segment with a fastener flange, an intermediate segment, and a front segment, having a free end presenting a circular outline suitable for being mounted by plane welding around a circular opening in the wall of the main pipe, said intermediate segment having a first wall and a second wall forming between them an angle of no more than 90° towards the internal passage, the free end of said branch connection stub having the same diameter as the diameter of the opening in the main pipe and said free end being mounted by plane welding around said circular opening.

In one possible configuration of the branch connection device, said intermediate segment comprises a first wall and a second wall forming between them an acute angle towards the internal passage.

Overall, by virtue of the solution of the present invention, it is possible to provide a stub forming a branch connection with a main pipe, in which the branch connection is not only not weakened, given the way it is obtained, but is also capable, because of the zone of axial and radial flexibility in the stub, of absorbing operating stresses more easily, whether mechanical stresses (pressure, force) or thermal stresses (low temperatures, temperature variations).

BRIEF DESCRIPTION OF THE DRAWINGS

Other advantages and characteristics of the invention appear on reading the following description made by way of example and with reference to the accompanying drawings, in which.

MORE DETAILED DESCRIPTION

Figure 3:
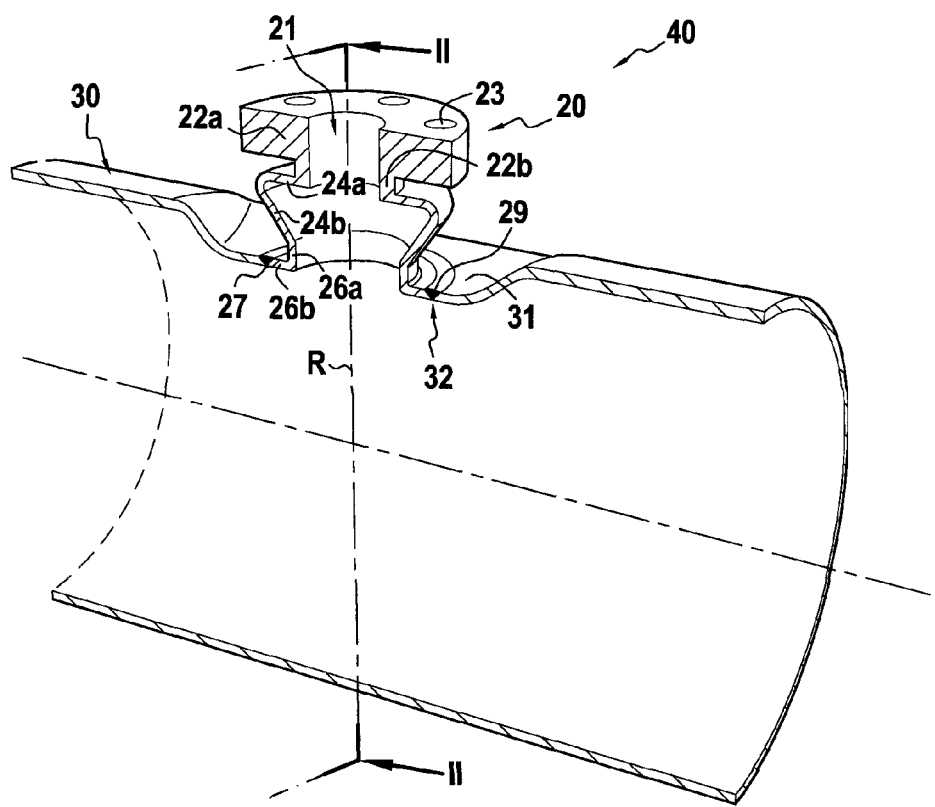
FIG. 3 is a fragmentary perspective view of the branch connection device of FIG. 2, in section on a longitudinal plane of the main pipe, in a direction III-III of FIG. 2.
Figure 2:
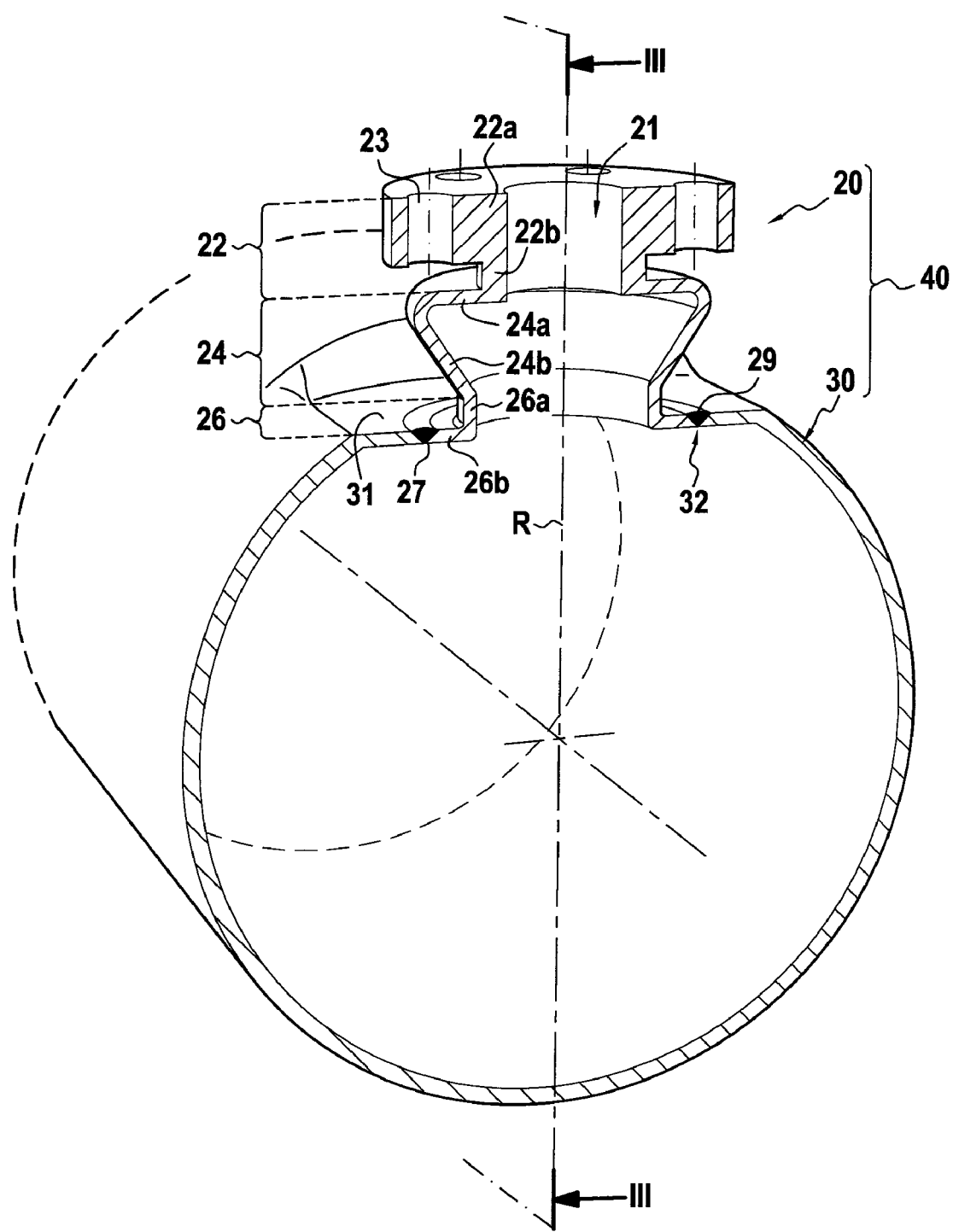
FIG. 2 is a fragmentary perspective view of a branch connection device between a stub of the invention and a main pipe, in cross-section relative to the main pipe, on direction II-II of FIG. 3.

Reference is made to FIGS. 2 and 3 that show two perspective views of an example of a branch connection stub 20 of the invention mounted on a main pipe 30, the assembly forming a branch connection device 40 and being shown respectively in cross-section and in longitudinal section relative to the main pipe 30.

The main pipe 30 has been pierced locally and stamped to have a flat imprint (plane zone 31) such that its wall presents a plane circular opening 32 that is different from openings forming the ends of the main pipe 30, and that is thus not coaxial with the main pipe 30.

The branch connection stub 20 is a body of revolution about an internal passage 21 on the axis of revolution R, and comprising in its axial direction: a rear segment 22 having a radial fastener flange 22a provided with fastener holes 23; an intermediate segment 24; and a front segment 26 having a free end 27 that presents a circular outline suitable for being mounted by plane welding around the circular opening 32 in the wall of the main pipe 30 (weld bead 29 in FIGS. 2 and 3).

The rear segment 22 also includes a cylindrical portion 22b that extends the fastener flange 22a axially.

The intermediate segment 24 comprises a first wall 24a and a second wall 24b that form an acute angle between each other towards the internal passage 21.

In general, the first wall 24a and the second wall 24b form between them an angle of no more than 90°, for the purpose of forming a reentrant angle facing the internal passage 21, thereby constituting the shape of a bellows fold for the intermediate segment 24.

In the configuration shown, the first wall 24a is an annular wall extending radially outwards from the rear segment, and the second wall 24b forms an annular taper going from the first wall 24a of the intermediate segment 24 towards the front segment 26, i.e. the diameter of the second wall 24b decreases on going away from the first wall 24a in the axial direction.

The above terms "radial direction" and "axial direction" relate specifically to the direction orthogonal to the axis of revolution R and to the direction of the axis of revolution R of the branch connection stub 20.

Figure 4:
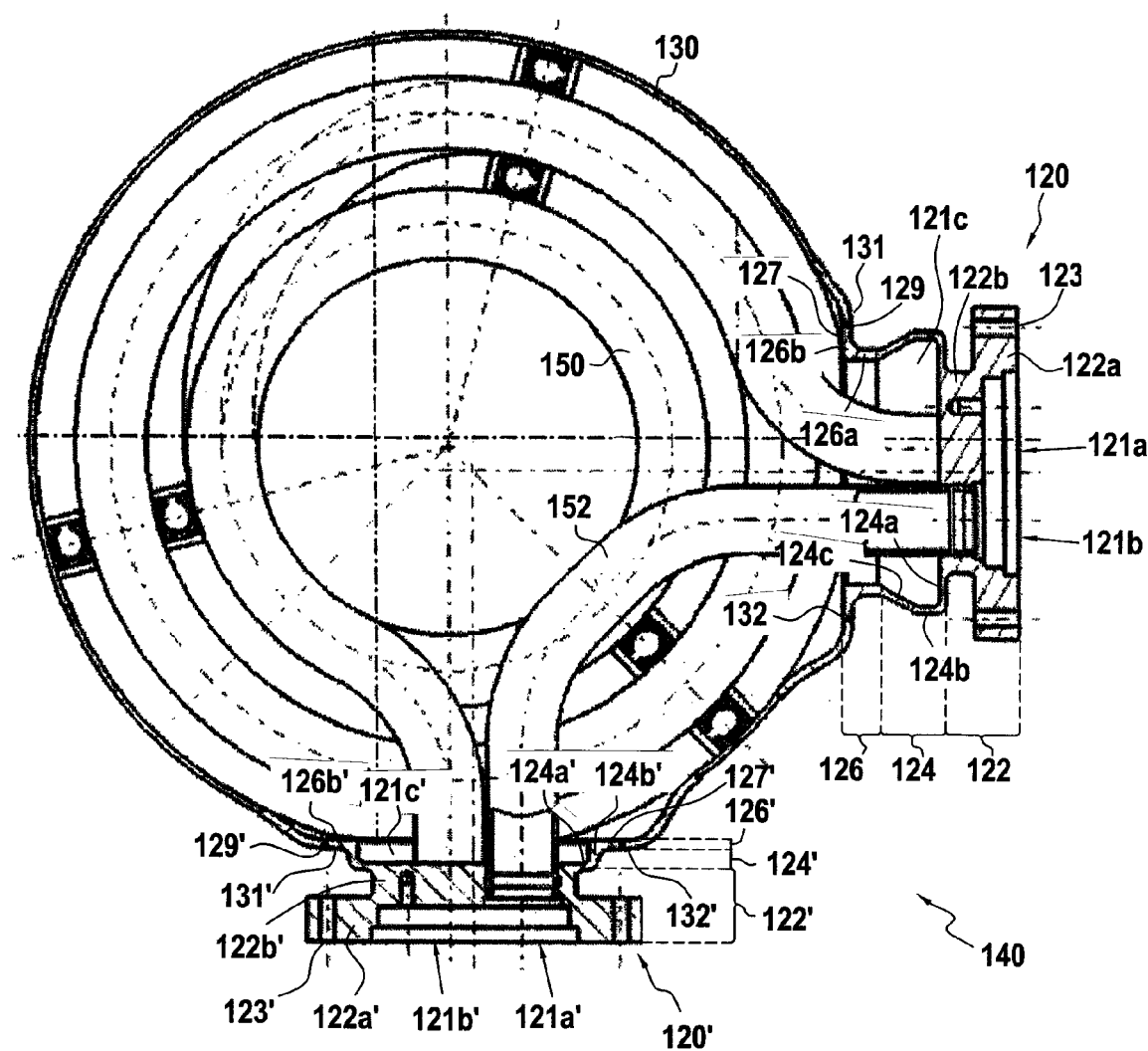
FIG. 4 shows the use of two branch connection stubs of the invention mounted on a main pipe of large diameter and serving as inlets and outlets for two coil tubes housed in the main pipe, so as to form another branch connection device acting as a heat exchanger.

In an alternative embodiment corresponding to the second branch connection stub 120' shown in FIG. 4, the first wall 24a remains an annular wall extending radially outwards from the rear segment, but the second wall is a cylindrical wall (first wall 124a' and second wall 124b' in FIG. 4).

In another alternative embodiment (not shown), the first wall of the intermediate segment forms an annular wall flaring from the rear segment, and the second wall forms an annular taper from the first wall of the intermediate segment going towards the front segment, so that the intermediate segment 24 presents a < > shape that corresponds to the conventional shape for a bellows fold.

From the intermediate segment 24, the front segment 26 comprises a cylindrical wall 26a and an annular wall 26b extending radially around the axis of revolution R, with the outer edge defining the free end 27 of the front segment 26 that forms the front end of the branch connection stub 20, and that is mounted by being welded to the circular opening 32 in the main pipe 30.

It can be understood that the front segment 26 comprises solely the annular wall 26b extending radially around the axis of revolution R, said annular wall 26b extending the second wall 24b of the intermediate segment 24, regardless of whether it is constituted by an annular taper or by a cylindrical wall.

Advantageously, the walls 24a and 24b of the intermediate segment 24 and the walls 26a and 26b of the front segment 26 present thickness that is substantially constant and equal to the thickness of the wall of the main pipe 30. In this way, welding is performed between two parts having the same thickness, between the circular opening 32 in the main pipe 30 and the outside edge of the free end 26 of the stub 20. Furthermore, the axial and radial flexibility zone of the stub 20, constituted by the intermediate and front segments 24 and 26, performs its role more easily since it constitutes an extension of material having the same thickness as the wall of the plane zone 31 of the main pipe 30, and thus without any dimensional discontinuity.

Reference is now made to FIG. 4 showing another branch connection device 140 of the invention comprising two branch connection stubs 120 and 120', and used in a hot heat exchanger.

In this device, the main pipe 130 has first and second plane circular openings 132 and 132' disposed at 90° to each other on a common branch connection segment of the main pipe 130, at the locations of first and second plane zones 131 and 131'.

The branch connection device 140 has first and second branch connection stubs 120 and 120', the first branch connection stub 120 being mounted by plane welding (weld bead 129) around the first circular opening 132, and the second branch connection stub 120' being mounted by plane welding (weld bead 129') around the second circular opening 132'.

Each of the first branch connection stub 120 and the second branch connection stub 120' has first and second axial internal passages 121*a* and 121*b* (or 121*a'* and 121'*b*) for mounting two bent tubes 150 and 152 that are housed inside the main pipe 130.

Apart from the fact that it no longer has a single internal passage, but has two distinct internal passages 121*a* and 121*b*, and apart from a difference associated with its intermediate segment 124, the first branch connection stub 120 is similar to the branch connection stub 20 of FIGS. 2 and 3. It should be observed that the first and second internal passages 121*a* and 121*b* are separate and pass through a solid cylindrical portion 122*b* of the rear segment 122, and that they open out into a common front internal passage 121*c* occupying the intermediate segment 124 and the front segment 126.

This first branch connection stub 120 comprises, in its axial direction: a rear segment 122 with a radial fastener flange 122*a* having holes 123 and the cylindrical portion 122*b*; an intermediate segment 124; and a front segment 126 having its free end 127 presenting a circular outline suitable for mounting by plane welding around the circular opening 132 in the wall of the main pipe 130.

The intermediate segment 124 does not have two walls but there walls.

The intermediate segment 124 comprises a first wall 124*a* and a second wall 124*b* forming between them a right angle towards the front internal passage 121*c*, the first wall 124*a* being an annular wall extending radially outwards from the rear segment 122, and the second wall 124*b* extending the first wall 124*a* of the intermediate segment 124 so as to form a circularly cylindrical wall.

The intermediate segment 124 further comprises a third wall 124*c* that tapers annularly from the second wall 124*b* of the intermediate segment 124 towards the front segment 126, the second wall 124*b* and the third wall 124*c* forming between them an obtuse angle towards the front internal passage 121*c*, so that the first wall 124*a* and the third wall 124*c* forming between them an acute angle towards the front internal passage 121*c*.

Going from the intermediate segment 124, the front segment 126 comprises a cylindrical wall 126*a* and an annular wall 126*b* extending radially, the outside edge thereof defining the free end 127 of the first branch connection stub 120 that is mounted in the first circular opening 132 of the main pipe 130.

In its axial direction, the second branch connection stub 120' comprises: a rear segment 122' with a radial fastener flange 122*a'* having holes 123' and a cylindrical portion 122*b'*; an intermediate segment 124'; and a front segment 126' with a free end 127' presenting a circular outline suitable for being mounted by plane welding around the circular opening 132' in the wall of the main pipe 130.

Nevertheless, the second branch connection stub 120' presents not only the presence of two internal passages 121*a'* and 121'*b* passing through the solid cylindrical portion 122*b'* of the rear segment 122', but also two other differences compared with the branch connection stub 20 of FIGS. 2 and 3:

the intermediate segment 124' has a first wall 124*a'* and a second wall 124*b'* that form between them a right angle towards the front internal passage 121'*c*, the first wall 124'*a* being an annular wall extending radially outwards from the rear segment 122', and the second wall 124*b'* extending from the first wall 124*a'* of the intermediate segment 124' in the form of a circularly cylindrical wall; and extending from the intermediate segment 124, the front segment 126' comprises solely an annular wall 126*b'* extending radially and having an outside edge that defines the free end 127' of the second branch connection stub 120', which end is mounted in the second circular opening 132' of the main pipe 130'.

Thus, the first branch connection stub 120 (and the second branch connection stub 120') comprises a body of revolution concerning its outside surface, the intermediate segment 124 (124'), and the front segment 126 (126').

The branch connection device 140 also has a first bent tube 150 and a second bent tube 152 located inside the main pipe 130. The first bent tube 150 forms a double coil connecting the first internal passage 121*a* of the first branch connection stub 120 to the second internal passage 121*b'* of the second branch connection stub 120'. The second bent tube 152 connects the second internal passage 121*b* of the first branch connection stub 120 to the first internal passage 121*a'* of the second branch connection stub 120'.

Thus, the branch connection segment of the main pipe 130 as shown in FIG. 4 forms a heat exchanger between a first fluid flowing in the main pipe 130 and a second fluid flowing through the first and second bent tubes 150 and 152 via the first and second branch connection stubs 120 and 120'.

More generally, the first branch connection stub 120 and the second branch connection stub 120' may each have at least one first and one second axial internal passage (121*a*, 121*b*; 121*a'*, 121*b'*), thereby covering variants having more than two axial internal passages in the rear segment 122, 122' of the first and second branch connection stubs 120, 120'. Likewise, more generally, the branch connection device comprises at least one first bent tube (150) and one second bent tube (152) located inside the main pipe (130) and connected to one of the axial internal passages.

In a hot heat exchanger for the space applications mentioned in the introduction and by way of example, the first fluid (to be heated) is liquid helium at an inlet temperature of −263° C. and the second fluid (heat source) is a combustion gas at a temperature of about 500° C.

According to the invention, a method is also proposed for making a welded connection between a main pipe 30 (or 130) and at least one branch connection stub 20 (or 120 and 120'), wherein the method comprises the following steps:

providing a main pipe 30 (or 130);

performing a stamping operation to flatten and pierce the wall of the main pipe 30 (or 130) at the location of a plane zone (plane zones 131 and 131'), thereby forming a plane circular opening 32 (132 and 132');

providing at least one branch connection stub 20 (or 120 and 120') including at least one axial internal passage 21 (121*a* to 121*c* and 121*a'* to 121*c'*), a rear segment 22 with a fastener flange 22*a*, an intermediate segment 24 (124 and 124'), and a front segment 26 (126 and 126') having a free end 27 (127 and 127') presenting a circular outline of the same diameter as the plane circular opening 32 (132 and 132') of the main pipe 30 (or 130), said intermediate segment 24 (124 and 124') having a first wall 24*a* (124*a* and 124*a'*) and a second wall 24*b* (124*b* and 124*b'*) forming between them an angle of no more than 90° towards the internal passage 21 (121*c* and 121*c'*); and making a plane weld between the outline of said circular opening 32 (132 and 132') in the wall of the main pipe 30 (or 130) and the free end (127 and 127') of the front segment 26 (126 and 126').

In a possible provision of the connection method, said intermediate segment comprises a first wall and a second wall forming between them an acute angle towards the internal passage.

Figure 1:
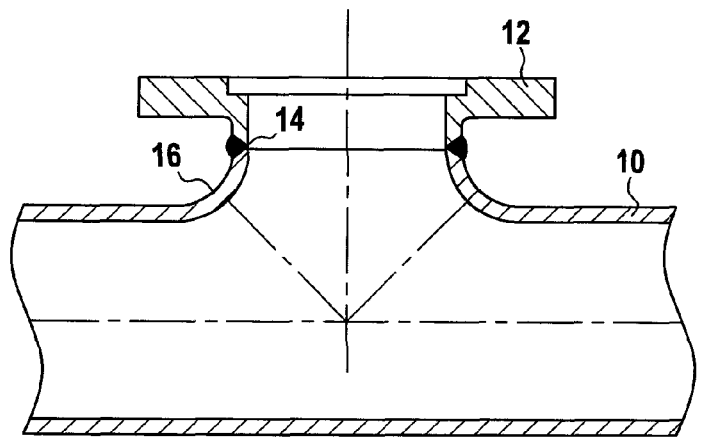
FIG. 1, described above, is a fragmentary section view showing a prior art configuration for a branch connection.

Thus, it can be understood that the plane zone 31 (the plane zones 131 and 131') of the main pipe 30 (or 130) does (do) not need to be thinned, as happens during the stretching to form the prior art collar 16 (FIG. 1).

With the branch connection stub 20 of FIGS. 2 and 3, the stub enables one tubular element to be mounted on another tubular element forming the main pipe 30 (connection between two tubular elements situated on either side of the branch connection stub 20).

For the branch connection stubs 120 and 120' of FIG. 4, the purpose is to mount three tubular elements (the main pipe 130, the first bent tube 150, and the second bent tube 152) on one side of the stub, in association with two tubular elements (not shown) situated on the other sides of the stubs.

The present invention is not limited to the embodiments described but covers other situations such that the branch connection stub of the invention serves to connect at least one tubular element, or a plurality of tubular elements to at least one other tubular element or a plurality of tubular elements via one or more internal passages.

What is claimed is:

1. A branch connection stub for connection to a main pipe having an annular wall, wherein the stub presents an outside surface of revolution and includes at least one axial internal passage, a rear segment with a fastener flange, an intermediate segment, and a front segment having a free end presenting a circular outline suitable for mounting by plane welding around a circular opening in the annular wall of the main pipe, said intermediate segment comprising a first annular wall extending radially outwards from the rear segment, a second wall that is circularly cylindrical extending the first annular wall, and a third wall forming an annular taper from the second wall of the intermediate segment towards the front segment, so that said first annular wall and said third wall form between them an acute angle towards the at least one axial internal passage, and wherein said front segment comprises a cylindrical wall adjacent the third wall of the intermediate segment and an annular wall extending radially from the cylindrical wall, an outside edge thereof defining the free end of the branch connection stub that is mounted in the circular opening in the annular wall of the main pipe.

2. A branch connection stub according to claim 1, wherein the front segment comprises an annular wall extending radially around the axis of revolution R, and having an outside edge that defines the free end of the front segment.

3. A branch connection stub according to claim 1, wherein the first wall of the intermediate segment forms an annular wall extending radially outwards from the rear segment.

4. A branch connection stub according to claim 1, wherein the walls of the intermediate segment and of the front segment present thickness that is substantially constant.

5. A branch connection device between a main pipe and a secondary pipe, the device comprising:
a main pipe having a lateral wall presenting a plane circular opening that is not coaxial with the main pipe, and at least one branch connection stub that presents an outside surface of revolution and that includes at least one axial internal passage, a rear segment with a fastener flange, an intermediate segment, and a front segment, having an outer radially free end presenting a circular outline suitable for being mounted by plane welding around a circular opening in the lateral wall of the main pipe, said intermediate segment having a first wall and a second wall forming between them an angle of no more than 90° towards the internal passage, the outer radially free end of said branch connection stub having a same diameter as a diameter of the circular opening in the main pipe and said outer radially free end being mounted by plane welding around the outline of said circular opening.

6. A branch connection device according to claim 5, wherein the walls of the intermediate segment and of the front segment presents thickness that is substantially constant and equal to the thickness of the wall of the main pipe.

7. A branch connection device according to claim 5, wherein the main pipe has first and second plane circular openings disposed at 90° to each other on a common branch connection segment of the lateral wall of the main pipe, and wherein the device has first and second branch connection stubs, the first branch connection stub being mounted by plane welding around the first circular opening and the second branch connection stub being mounted by plane welding around the second circular opening.

8. A branch connection device according to claim 7, wherein each of the first and second branch connection stubs includes at least first and second axial internal passages, and wherein the device further includes at least a first bent tube and a second bent tube disposed inside the main pipe, the first bent tube connecting the first internal passage of the first branch connection stub to the second internal passage of the second branch connection stub and the second bent tube connecting the second internal passage of the first branch connection stub to the first internal passage of the second branch connection stub, whereby the branch connection segment of the main pipe forms a heat exchanger between a first fluid flowing in the main pipe and a second fluid flowing in the first and second bent tubes.

9. A branch connection device according to claim 8, wherein the first bent tube forms a double coil.

10. A branch connection device according to claim 5, wherein said intermediate segment comprises a first wall and a second wall forming between them an acute angle towards the internal passage.

11. A branch connection device between a main pipe and a secondary pipe, the device comprising:
a main pipe having a wall presenting a plane circular opening that is not coaxial with the main pipe, and at least one branch connection stub that presents an outside surface of revolution and that includes at least one axial internal passage, a rear segment with a fastener flange, an intermediate segment, and a front segment, having a free end presenting a circular outline suitable for being mounted by plane welding around a circular opening in the wall of the main pipe, said intermediate segment comprises a first wall and a second wall forming between them an acute angle towards the internal passage, the free end of said branch connection stub having the same diameter as the diameter of the opening in the main pipe and said free end being mounted by plane welding around said circular opening.

* * * * *